April 12, 1966   A. F. SCARPELLI   3,246,113
ELECTRICAL STOCK REMOVAL APPARATUS
Filed Sept. 18, 1962

INVENTOR.
August F. Scarpelli
BY
Hugh L. Fisher
ATTORNEY

United States Patent Office 3,246,113
Patented Apr. 12, 1966

3,246,113
ELECTRICAL STOCK REMOVAL APPARATUS
August F. Scarpelli, Warren, Mich., assignor to General Motors Corporation, Detroit, Mich., a corporation of Delaware
Filed Sept. 18, 1962, Ser. No. 224,313
10 Claims. (Cl. 219—69)

This invention relates to improvements in apparatus for electrical stock removal.

In any electrical stock removal process and particularly that known as Electrical Discharge Machining, the machining rate is one of the primary concerns and efforts are constantly being made to increase it. Since the machining rate is determined by the frequency of the electrical discharges occurring across the gap between the cutting tool and the workpiece and causing stock to be eroded from the workpiece, it can be appreciated that an accurate control of the duration of these discharges is needed. Any attempt to provide such a control must keep in mind that the duration of each electrical discharge is determined by the total time required to produce first a gap ionization or breakdown, then a discharge, and thereafter a gap deionization. Once the gap breaks down, of course, discharge current will flow and continue to flow until the gap again deionizes. Additionally, the oscillatory nature of the discharge may, if excessive, slow the process by interfering with the initiation of the next discharge. Another factor is that the frequency of the discharges affects the finish on the workpiece.

This need for an accurate control is even more pronounced when the power supply relies upon a capacitor for the pulsating energy. The charging time of the capacitor will control the machining rate, and therefore, it is difficult to independently control the different electrical parameters involved, e.g., capacitor voltage before discharge, arcing current time, current pulse shape, current pulse height, and current pulse width.

Another related problem with this power supply employing a capacitor is the isolation of the voltage source from the machining gap. There is a tendency once a discharge occurs across the gap for current to continue to flow into the gap from the voltage source, thus resulting in a continuous discharge or arc. This does not permit the capacitor to recharge and obviously would slow down if not entirely stop the machining.

Accordingly, it is one of the aims of the invention to provide a novel power supply for carrying out the electrical discharge machining process. The power supply affords a switch means that interrupts current flow through the gap in a positive way thus producing isolation of the voltage source from the gap while facilitating an increase in the machining rate. A related and more specific aim is to provide a power supply utilizing a controlled rectifier for switching on and off a discharge circuit, which includes the gap. The switching is done by utilizing charging voltage for switching on the controlled rectifier thereby initiating the discharge and an induced reverse current for switching off the controlled rectifier.

The invention also contemplates the provision of a series of parallel circuits, each charged by a common voltage source and arranged to be connected across the gap in a certain sequence. The individual circuits are immediately ready to discharge across the gap and each may be switched on at a frequency determined by the requirements of a given application of the invention and switched off by a condition of the electrical discharge. Specifically, the parallel circuits each include a controlled rectifier in series with a source charged capacitor and the machining gap. The controlled rectifier when triggered on completes the circuit and a discharge occurs across the gap. The controlled rectifier is thereafter rendered non-conductive by a bias voltage. In one embodiment, this bias voltage is derived from an impedance in series with the gap. In another embodiment, the next succeeding circuit to be conductive provides the bias voltage for cutting off the controlled rectifier.

The foregoing and other objects and advantages of the invention will be apparent from the following description and the accompanying drawings in which.

Figure 1:
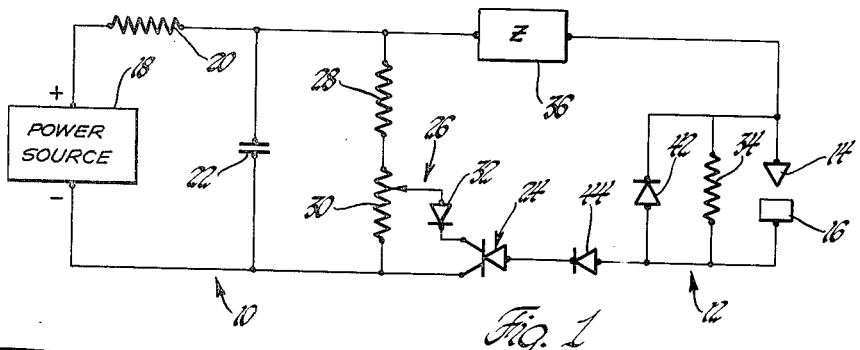
FIGURE 1 is a schematic diagram of a circuit embodying the principles of the invention.

Referring now to the drawings, and particularly to FIGURE 1, the numerals 10 and 12 designate respectively the charging and discharging circuits for an electrical discharge machining power supply. The circuits 10 and 12 apply an intermittent voltage across a gap formed between two conductive electrodes 14 and 16. The electrodes 14 and 16 will hereinafter be referred to respectively as the cutting tool and the workpiece. A suitable dielectric fluid is flowed through the gap and the intermittent voltage causes electrical stock removing discharges to occur such that material is eroded from the workpiece 16 in a known way, according to a pattern determined by the configuration of the cutting tool 14. The proper gap spacing may be maintained in any known way by maneuvering either the cutting tool 14 or the workpiece 16 or both. One way is disclosed in Patent No. 3,059,150 to Colten et al.

The charging circuit 10 illustrated in FIGURE 1 includes a suitable power source 18, a current limiting resistor 20, and provision for storing the electrical energy from the source 18, which in this embodiment is a capacitor 22 connected across the power source 18. The current limiting resistor 20 affords some isolation of the power source 18 from the gap after the gap has been ionized and current is flowing therethrough.

The discharging circuit 12 also includes the capacitor 22, which is arranged in series with the gap formed between the cutting tool 14 and the workpiece 16. Customarily, the voltage on the capacitor 22 will increase until sufficient in magnitude to produce a gap ionization or breakdown. At this time, the capacitor 22 will discharge and the electrical stock removing discharge will occur across the gap. Despite the current limiting resistor 20, there is still a tendency for current to continue flowing across the gap from the power source 18 once a discharge has taken place and even though the capacitor 22 is substantially completely discharged. Of course, as can be appreciated, the frequency of the discharges across the gap 14 and 16 are controlled by the rate at which the capacitor 22 can be charged and discharged, for once a discharge has occurred, a certain time interval must elapse so that the gap can deionize before the capacitor 22 is recharged. Otherwise, instead of having a spark discharge, a continuous arc could possibly take place and produce damage to the workpiece 16 as well as considerably slow the process.

For the just mentioned reason, a unique switching arrangement is included in the discharging circuit 12 and functions to initiate a discharge as well as terminate it by, in effect, opening and closing the discharging circuit 12. In the preferred embodiment, the switching arrangement employs a silicon controlled rectifier 24, which is in series with the gap and the capacitor 22. The silicon controlled rectifier 24 is controlled by a control or trigger circuit 26. The trigger circuit 26 includes a voltage dividing network comprised of a fixed resistor 28 and a variable resistor 30. The variable resistor 30 is adjusted so as to apply some selected voltage to the gate of the silicon controlled rectifier 24 through a one-way conducting device as diode 32. Diode 32, as will become apparent, prevents damage to the gate of the controlled rectifier 24 from reverse current.

For examplary purposes, it will be assumed that three volts when applied to the gate of the controlled rectifier 24 will cause the controlled rectifier 24 to switch from a high forward impedance to a low forward impedance and thereby become conductive. At this time the capacitor 22 will have been charged to say, one hundred volts. When the controlled rectifier 24 switches to a low impedance and becomes conductive, the capacitor 22 will discharge, the gap having been ionized so that current will flow around the discharging circuit 12. A resistor 34 is connected across the gap and permits a holding current of approximately 20 milliamps to continue to flow through the silicon controlled rectifier 24 so as to maintain its low forward impedance state.

Figure 2:
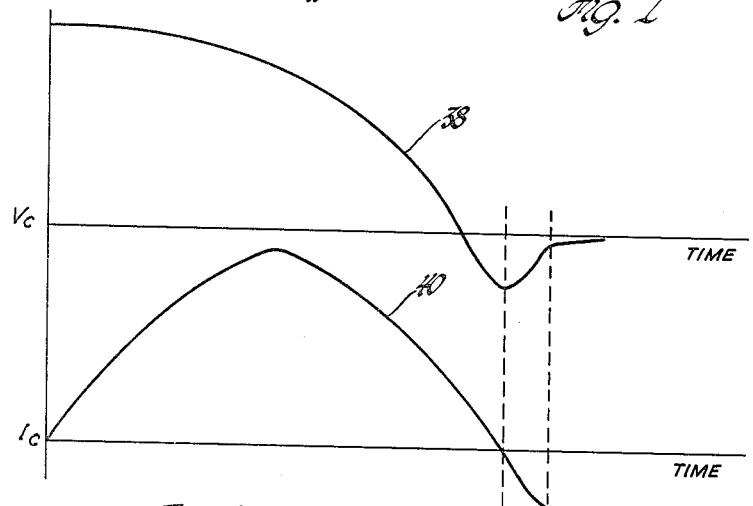
FIGURE 2 shows gap current and voltage traces obtained with the FIGURE 1 circuit.

To turn off the controlled rectifier 24 and revert it back to its high impedance state, an impedance 36 is installed in the discharging circuit 12 and is preferably inductive so as to produce a reverse current. This reverse current develops due to the tendency for the inductance to maintain current flow after the capacitor 22 is completely discharged. Consequently, the capacitor 22 will acquire a negative charge or a negative voltage ($V_c$) as shown by the curve 38 in FIGURE 2. The capacitor current ($I_c$) will eventually reduce to zero and then start to flow in the reverse direction as depicted by the curve 40 in FIGURE 2. This reverse current will shut off the controlled rectifier 24 within the time $T_1$ in FIGURE 2.

Because of this reverse current, two additional unidirectional conducting devices as diodes 42 and 44 are included in the discharging circuit 12. Diode 42 is connected across the gap and insures that the reverse currents do flow around the gap and not across the gap so as to insure that the controlled rectifier 24 is shut off. Otherwise, for some reason, gap conditions may prevent reverse currents. The diode 44, being in series with the controlled rectifier 24, affords protection for the controlled rectifier 24 against excessive reverse currents, which could develop during the shut-off time. Additionally, the diode 42 in preventing reverse currents from flowing across the gap does cause the life of the cutting tool 14 to be enhanced.

In summary, with the FIGURE 1 power supply the capacitor 22 will initially charge to some predetermined voltage as 100 volts, at which time the gate voltage established by the setting of the adjustable resistor 30 will produce a gate current adequate to fire the controlled rectifier 24. Immediately, the capacitor 22 will discharge across the gap between the cutting tool 14 and the workpiece 16 assuming gap conditions are proper. Thus, the controlled rectifier 24 initiates the discharge by, in effect, completing or switching on the discharging circuit 12. Interruption of the discharging circuit 12 is automatic and occurs when the reverse current is developed by the inductive impedance 36 for turning off the controlled rectifier 24. There is no concern, therefore, about the power source 18 being able, or even being permitted, to continue to maintain the gap conductive once a discharge has occurred, for any sustained arc is blocked due to the reverse current switching off the controlled rectifier 24. When switched off, the controlled rectifier 24 reverts back to its state in which a high impedance is offered to forward current flow. Of course, the discharging circuit 12 must be maintained conductive in the forward direction to erode material from the workpiece 16. Hence, when the controlled rectifier 24 is switched off, machining stops.

Figure 3:
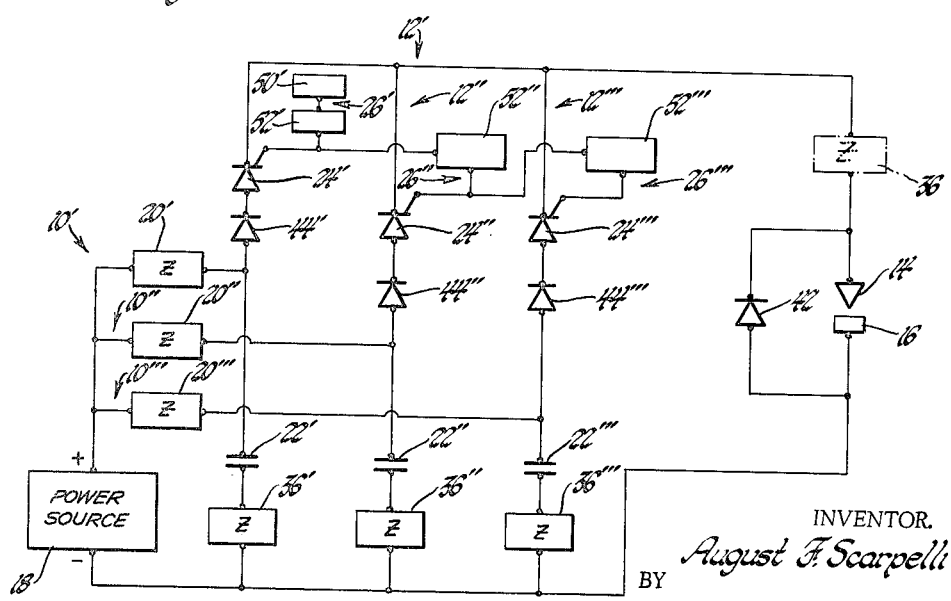
FIGURE 3 is a schematic diagram of electrical circuitry embodying further principles of the invention.

The power supply in FIGURE 3 affords greater versatility than that in FIGURE 1. Considering the FIGURE 3 power supply in detail, in some instances the same numerals as those in FIGURE 1 have been utilized to designate corresponding elements of the circuitry, whereas in other instances related elements have been assigned prime numbers. As will be noted, three different charging circuits 10′, 10″, and 10‴ are used along with three discharging circuits 12′, 12″, and 12‴. Actually, any number of charging and discharging circuits may be employed. The number will be determined by the requirements of a particular power supply.

For purposes of brevity, only one of three charging and discharging circuits will be described since all are similar. The actual relationship of each to the other will be explained in the operational summary. Noting now the first charging circuit 10′, all the elements involved have a prime number. Hence, the circuit 10′ includes an impedance 20′ either inductive or resistive, an energy storage provision as capacitor 22′ and an impedance 36′ all arranged in series with the power source 18. Impedance 36′ may beither inductive or resistive and is utilized to shape the current pulse from the capacitor 22′.

The discharging circuit 12′ includes the same capacitor 22′ and the same impedance 36′ and additionally a switch provision as silicon controlled rectifier 24′ in series with the gap formed between the cutting tool 14 and the workpiece 16. A diode 44′ serves the same function as the diode 44 in the FIGURE 1 power supply, i.e., it protects the silicon controlled rectifier 24′ from excessive reverse currents by providing additional resistance to reverse current flow.

The gate of the controlled rectifier 24′ is controlled by a control or trigger circuit 26′. In this embodiment, the trigger circuit 26′ includes a triggering provision as a pulse generator 50′ and a monostable multivibrator 52′. The pulse generator 50′ develops a periodic output pulse that switches the multivibrator 52′ from the stable state to the unstable state. When the multivibrator 52′ reverts to the stable state after a predetermined time interval, the resultant ouput gate signal pulse will trigger the controlled rectifier 24′ on. This same output pulse from the multivibrator 52′ is used to set the second discharging circuit multivibrator 52″ in the unstable state. Again multivibrator 52″ after a certain time interval will switch to its stable state and produce an output gate pulse for (1) switching the controlled rectifier 24″ on and (2) resetting multivibrator 52‴ to its unstable state for the selected time interval. Other ways of accomplishing this will become apparent to those versed in the art.

In summarizing the operation of the FIGURE 3 power supply, it will be observed that initially all of the controlled rectifiers 24′, 24″, and 24‴ are non-conductive and capacitors 22′, 22″, and 22‴ are all charged to the voltage of the power source 18. When the multivibrator 52′ is changed to its unstable state by the pulse generator 50′, the resultant gate pulse supplied to the controlled rectifier 24′ will render it conductive. The now conductive controlled rectifier 24′ permits the discharging circuit 12′ to be completed and the capacitor 22′ will discharge across the gap. The controlled rectifier 24′ can be turned-off in the way described with respect to the FIGURE 1 power supply or as shown in FIGURE 3. In FIGURE 3, the controlled rectifier 24′ is turned-off by turning on the second discharging circuit controlled rectifier 24″. This occurs when the multivibrator 52″ returns to its stable state after the mentioned time interval. At this time, the output gate pulse will trigger the controlled rectifier 24″ on. Since the capacitor 22′ will have been discharged to a substantially lower voltage than the capacitor 22″, the higher voltage from capacitor 22″ will apply a reverse bias to the controlled rectifier 24′ and cause the controlled rectifier 24′ to be turned off.

In a similar way, the capacitor 22″ will discharge across the gap and thereafter be turned off when the controlled rectifier 24‴ becomes conductive. Again, this occurs following some predetermined time interval after which the third discharging circuit multivibrator 52‴ reverts to its stable state and generates a gate signal for switching on the controlled rectifier 24‴. The resultant reverse bias turns off the controlled rectifier 24″. Conduction by the controlled rectifier 24''' will continue until it is turned off due to the reverse bias voltage applied thereto when the first charging circuit controlled rectifier 24' conducts. This rectifier 24' is turned on by the pulse generator 50' a certain time interval after the third discharging circuit 12''' has been conductive. Actually, the frequency at which the pulse generator 50' operates must be correlated with the operation of the discharging circuit 12''' so that the discharging circuit controlled rectifier 24''' is shut off properly, i.e., neither too soon nor too late.

The function of the impedances 36', 36'', and 36''' can now be appreciated, for each can be used to shape the current pulse such that each pulse from the respective capacitor 22', 22'', and 22''' is different. This permits very accurate control of the spillover current and thus the durability of the cutting tool 14. This spillover current, as explained in application S.N. 192,472 filed May 4, 1962, also to August F. Scarpelli, maintains the gap alive long enough to promote the formation of a hardened layer of material on the exterior surface of the cutting tool 14. This hardened layer substantially increases the life of the cutting tool 14. If it is desired to have all of the pulses alike, then the impedance 36 may be installed as in the FIGURE 1 power supply and as illustrated by the broken lines in FIGURE 3 so as to be common to each of the charging circuits 12', 12'', and 12'''. With the pulses identical, surface finish can be more easily predicted. Or, an inductive or capacitive type impedance, as the impedance 36, may be installed in parallel with each capacitor 22', 22'', and 22''' also for pulse shaping purposes.

With the FIGURE 3 power supply, the frequency of the discharges across the gap can be controlled by the action of the controlled rectifiers, for conduction by the controlled rectifier 24', which is started by the pulse generator 50', discharges capacitor 22'. Initiation of conduction by the controlled rectifier 24'' dumps capacitor 22'' and shuts off controlled rectifier 24'. The same thing happens when the controlled rectifier 24''' is fired; namely, the capacitor 22''' is discharged and the controlled rectifier 24'' is shut off. The cycle is repeated by the operation of the pulse generator 50' and the pulse frequency can be increased indefinitely, being limited only by the pulse width and the output of the power source 18. This is because there is no time lag while waiting for a capacitor to charge. Each capacitor 22', 22'', and 22''' is able to charge while the other is discharging. Therefore, the frequency of discharges across the gap is completely independent of capicitor charging time; in fact, the FIGURE 3 power supply permits a wide variety of pulse shapes to be applied to the gap. For example, one pulse can be added directly behind the previous one to form a double humped pulse, thus affording the very desirable versatility often needed to machine different materials with different available power sources.

If preferred, the pulse generator 50' can be used to successively trigger each controlled rectifier 24', 24'', and 24'''. As before, the reverse bias can be used to turn off the preceding controlled rectifier.

As will now be appreciated by the use of the controlled rectifier in the discharging circuit of a power supply, complete control of the discharge current can be maintained while permitting the various electrical parameters to be controlled independently, e.g., the capicitor voltage before discharge, the D.C. arcing time, the current pulse height, the current pulse width, the current pulse frequency, and the current pulse shape.

The invention is to be limited only by the following claims.

1. In electrical stock removal apparatus, the combination of conductive cutting tool and workpiece electrodes spaced apart so as to form a gap therebetween, an electrical energy source, and a circuit for connecting the source across the gap, the circuit including a controlled rectifier for controlling the circuit, the controlled rectifier including a gate electrode, means supplying a gate pulse to the gate electrode so as to render the controlled rectifier conductive and cause a stock removing discharge to occur across the gap, and means communicating with the gap and operative in response to a certain condition thereof for imposing a reverse bias on the controlled rectifier so as to render the controlled rectifier non-conductive.

2. In electrical stock removal apparatus, conductive cutting tool and workpiece electrodes spaced apart so as to form an ionizable fluid filled gap therebetween, electrical energy storage means, a charging circuit including the storage means and a source of current for charging the storage means, a discharging circuit including the storage means, a controlled rectifier both in series with the gap, and a control circuit for the controlled rectifier, the control circuit being responsive to the energy level of the storage means so that at a certain energy level adequate to produce a gap breakdown the control circuit will render the controlled rectifier conductive in a forward direction and thereby cause an electrical stock removing discharge to occur across the gap, and means effective to produce a reverse current in the discharging circuit after the discharge has been initiated so as to cause the controlled rectifier to cut off and thereby isolate the source of current from the gap.

3. In electrical stock removal apparatus, the combination of conductive cutting tool and workpiece electrodes spaced apart so as to form an ionizable fluid filled gap therebetween, electrical energy storage means for storing electrical energy, a charging circuit including the storage means and a source of electrical energy for charging the storage means, and a discharging circuit including the storage means, impedance means, and a controlled rectifier each in series with the gap, and a gate circuit responsive to the energy level of the storage means and arranged at a certain energy level adequate to produce a gap breakdown to render the controlled rectifier conductive in a forward direction so as to complete the discharging circuit and thereby cause the storage means to produce an electrical stock discharge across the gap, and means in the discharging circuit for inducing a current reversal therein for biasing the controlled rectifier off after the discharge has been initiated so as to interrupt the discharging circuit and thereby isolate the source and the gap.

4. In electrical stock removal apparatus, conductive cutting tool and workpiece electrodes spaced apart so as to form a dielectric fluid filled gap therebetween, capacitive means for storing a predetermined voltage, a charging circuit including the capacitive means and a voltage source for charging the capacitive means, and a discharging circuit including the capacitive means, inductive means, and a silicon controlled rectifier all in series with the gap, a gate circuit for the silicon controlled rectifier including a voltage divider network connected across the capacitive means, the gate circuit being arranged to render the silicon controlled rectifier conductive in a forward direction when the voltage on the capacitive means has built up to a predetermined level so as to complete the discharging circuit and permit the capacitive means to produce a stock removing discharge across the gap, the inductive means causing the capacitive means to charge to a reverse voltage after a discharge has been initiated and thereby induce a reverse current flow in the discharging circuit for rendering the silicon controlled rectifier non-conductive and thereby interrupting current flow in the discharging circuit, a one-way conducting device connected across the gap and so poled as to permit reverse current flow.

5. In electrical stock removal apparatus; the combination of conductive cutting tool and workpiece electrodes spaced apart so as to form a gap therebetween; an electrical energy source; a series of circuits each connected to the source and each including switching means having a conductive state in which the associated circuit is connected across the gap so as to produce an electrical stock removing discharge thereacross and a non-conductive state in which the gap and the source are isolated from each other; and means operating the switching means for each circuit so that the circuits are individually and sequentially connected across the gap, and means rendered operative by a subsequently conductive switching means to impose a reverse bias on the previously conductive switching means for changing the previously conductive switching means to the non-conductive state.

6. In electrical stock removal apparatus; the combination of conductive cutting tool and workpiece electrodes spaced apart so as to form a gap therebetween; a source of electrical energy; a series of parallel circuits each connected to the source and each including a controlled rectifier having a conductive state in which the associated circuit is connected across the gap so as to produce an electrical stock removing discharge thereacross and a non-conductive state in which the gap and the source are isolated from each other and a control circuit operative to cause the controlled rectifier to be forward biased to the conductive state; triggering means rendering the control circuits each operative in a certain sequence so as to constitute a cycle of operation; the circuits and their respective controlled rectifiers being so arranged relative to each other that when one controlled rectifier is in the conductive state to connect the associated parallel circuit across the gap the previously conductive controlled rectifier is reverse biased to the non-conductive state by the energy applied to the gap by way of the one controlled rectifier; and means initiating and continuously repeating the certain sequence of operation of the circuits.

7. In electrical stock removal apparatus; the combination of conductive cutting tool and workpiece electrodes spaced apart so as to form a gap therebetween; a source of energy; plural circuits each connected to the source and each including a controlled rectifier having a conductive state in which the associated plural circuit is connected across the gap so as to produce an electrical stock removing disharge thereacross and a non-conductive state in which the gap and the source are isolated from each other and a control circuit operative to cause the controlled rectifier to assume the conductive state; triggering means rendering the control circuits each successively operative a certain time interval apart so as to constitute a cylce of operation; means sequentially initiating operation of a first one of the control circuits both so as to commence and continuously repeat the cycle of operation; the plural circuits being arranged in parallel so that the energy applied across the gap by one of the plural circuits will cause a reverse bias to be imposed on the previously conductive controlled rectifier for changing the previously conductive controlled rectifier to the non-conductive state.

8. In electrical stock removal apparatus; the combination of conductive cutting tool and workpiece electrodes spaced apart so as to form a gap therebetween; an electrical energy source; a plurality of parallel circuits each including energy storage means connected across the energy source, a controlled rectifier having a conductive state in which the associated parallel circuit is completed so as to cause the energy storage means to produce an electrical stock removing discharge cross the gap and a non-conductive state in which the associated parallel circuit is interrupted, and a control circuit operative to cause the controlled rectifier to assume the conductive state; the control circuits each including triggering means so interrelated as to successively render each control circuit operative a certain time interval apart so as to constitut a cycle of operation; means sequentially initiating operation of a first one of the control circuits both so as to commence and continuously repeat the cycle of operation; each energy storage means when producing an electrical discharge during the cycle of operation being arranged to also impose a reverse bias on the previously conductive controlled rectifier so as to change the previously conductive controlled rectifier to the non-conductive state.

9. In electrical stock removal apparatus; the combination of conductive cutting tool and workpiece electrodes spaced apart so as to form a gap therebetween; a voltage source; a plurality of parallel circuits each including capacitive storage means connected across the voltage source, a controlled rectifier having a conductive state in which the associated parallel circuit is completed so as to cause the capacitive storage means to produce an electrical stock removing discharge across the gap and a non-conductive state in which the associated parallel circuit is interrupted, and a control circuit operative to cause the controlled rectifier to assume the conductive state; the control circuits each including interrelated trigger means for successively rendering the control circuits operative a certain time interval apart so as to constitute a cycle of operation; means sequentially initiating operation of a first one of the trigger means both so as to commence and continuously repeat the cycle of operation; each capacitive storage means when producing a discharge during the cycle of operation being arranged to also impose a reverse bias on the previously conductive controlled rectifier for changing the previously conductive controlled rectifier to the non-conductive state.

10. In electrical stock removal apparatus; the combination of conductive cutting tool and workpiece electrodes spaced apart so as to form a machining gap therebetween; a voltage source; and a pair of parallel circuits each including a capacitor connected across the voltage source, a silicon controlled rectifier having a conductive state in which the associated parallel circuit is completed so as to cause the capacitor to produce an electrical stock removing discharge across the gap and a non-conductive state in which the associated parallel circuit is interrupted, and a control circuit operative to cause the controlled rectifier to assume the conductive state; the control circuits each including interrelated triggers for successively rendering each control circuit operative a certain time interval apart so as to constitute a cycle of operation; and means sequentially initiating operation of a first one of the trigger means both so as to commence and continuously repeat the cycle of operation; the pair of parallel circuits being so arranged that the voltage applied across the gap by the capacitor in one parallel circuit also biases the previously conductive controlled rectifier in the other parallel circuit to the non-conductive state.

References Cited by the Examiner
UNITED STATES PATENTS

| | | | |
|---|---|---|---|
| 2,473,915 | 6/1949 | Slepian et al. | 219—113 X |
| 2,835,784 | 5/1958 | Williams | 219—69 |
| 2,871,410 | 1/1959 | Matulaitis | 219—69 X |
| 2,895,080 | 7/1959 | Branker | 219—69 X |
| 2,951,930 | 9/1960 | McKechnie | 219—69 |
| 2,987,609 | 6/1961 | Williams et al. | 219—69 |
| 3,018,411 | 1/1962 | Webb | 219—69 X |
| 3,020,448 | 2/1962 | Fefer | 219—69 X |
| 3,056,065 | 9/1962 | Porterfield | 219—69 X |

OTHER REFERENCES

R. P. Turner: "Semiconductor Devices," pages 140, 141, 167–169, Holt, Rinehart & Winston, Incorporated, New York, New York, 1961.

RICHARD M. WOOD, *Primary Examiner.*

ANTHONY BARTIS, *Examiner.*